United States Patent [19]
Nyman

[11] Patent Number: 4,711,199
[45] Date of Patent: Dec. 8, 1987

[54] DEVICE FOR BREEDING FISH AND SHELLFISH

[75] Inventor: Lars-Erik Nyman, Enebyberg, Sweden

[73] Assignee: Flygt AB, Solna, Sweden

[21] Appl. No.: 899,200

[22] Filed: Aug. 21, 1986

[30] Foreign Application Priority Data

Aug. 23, 1985 [SE] Sweden .................... 8503939

[51] Int. Cl.$^4$ ............................................ A01K 61/00
[52] U.S. Cl. ................................................................ 119/3
[58] Field of Search ................................ 119/2, 3, 4, 5

[56] References Cited

U.S. PATENT DOCUMENTS

| | | | |
|---|---|---|---|
| 3,716,025 | 2/1973 | Lawson | 119/3 |
| 3,870,018 | 3/1975 | Fruchtnict | 119/3 |
| 3,900,004 | 8/1975 | Goldman et al. | 119/3 |
| 4,144,840 | 3/1979 | Bubien | 119/3 |
| 4,394,846 | 7/1983 | Roels | 119/3 X |
| 4,399,769 | 8/1983 | Casey | 119/3 |
| 4,422,408 | 12/1983 | Pohlhausen | 119/3 |
| 4,615,301 | 10/1986 | Maekawa et al. | 119/3 |

Primary Examiner—William F. Pate, III
Assistant Examiner—Richard Chilcot, Jr.
Attorney, Agent, or Firm—Menotti J. Lombardi

[57] ABSTRACT

A device and a plant for breeding fish, shellfish, etc. includes one or several tanks of a non-rigid material which are lowered into the water. Each tank has at least one inlet and at least one outlet for water. The inlet and the outlet are so arranged that the water level in the tank is somewhat above the surrounding level to maintain the walls of the tank in a tightened out position by the higher static pressure in the tank.

2 Claims, 2 Drawing Figures

DEVICE FOR BREEDING FISH AND SHELLFISH

BACKGROUND OF THE INVENTION

The invention concerns a device for breeding fish, shellfish, etc. in tanks lowered into water.

In the most common type of fish breeding today, the fish is contained in nets lowered into the sea, a lake or a water current. Fresh water is then continuously fed which is a condition for the breeding, unless special purification plants are used.

The disadvantages with such systems are several. Purifications and food waste may be collected at the bottom under the net, poison the surroundings and sometimes even the fish. In addition there is often a large waste of food and the nets must quite often be cleaned from algae. Finally, the breeding is dependent on the temperature of the surrounding water as well as on the contents of oxygen and natural nourishment therein. These conditions are of course dependent on the season which means that the growth is sometimes very low.

Fish breeding in closed tanks provided with purification plants has up to now turned out to be too expensive to be utilized on a large scale, primarily becausae the breeding must take place on land.

SUMMARY OF THE INVENTION

These objects and others which will become apparent hereinafter are accomplished by the present invention which provides a device for breeding fish, shellfish and the like for use in a liquid environment comprising a tank of a non-rigid material having an inlet and an outlet providing a fluid to the tank, the inlet and the outlet are so dimensioned that the pressure of the fluid in the tank is at a level higher than that of the surrounding environment means located in the tank for collecting sludge and gas and an outlet pipe joined to the collecting means.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
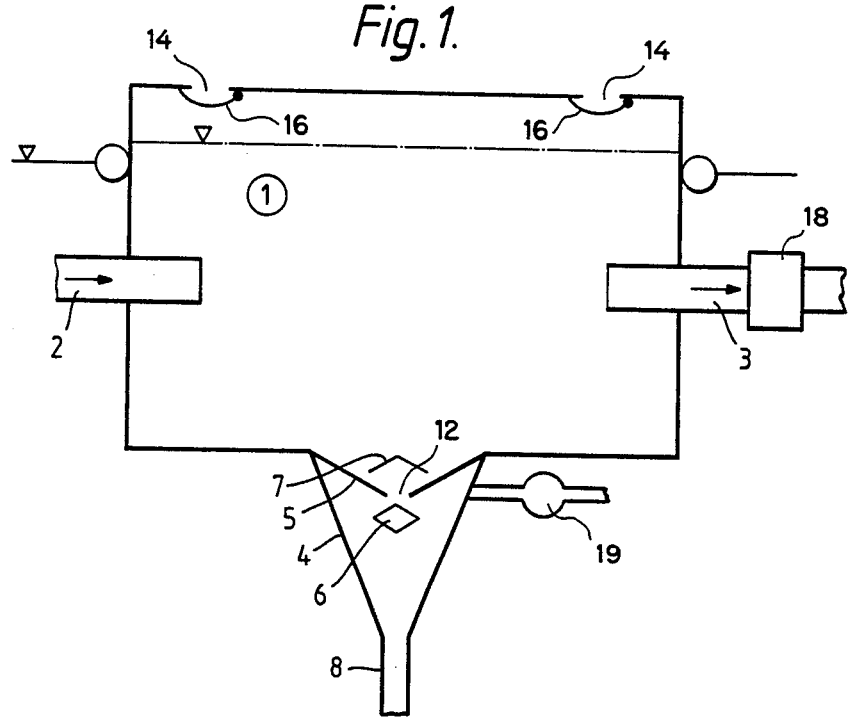
FIG. 1 is a side view of a tank according to the invention.
Figure 2:
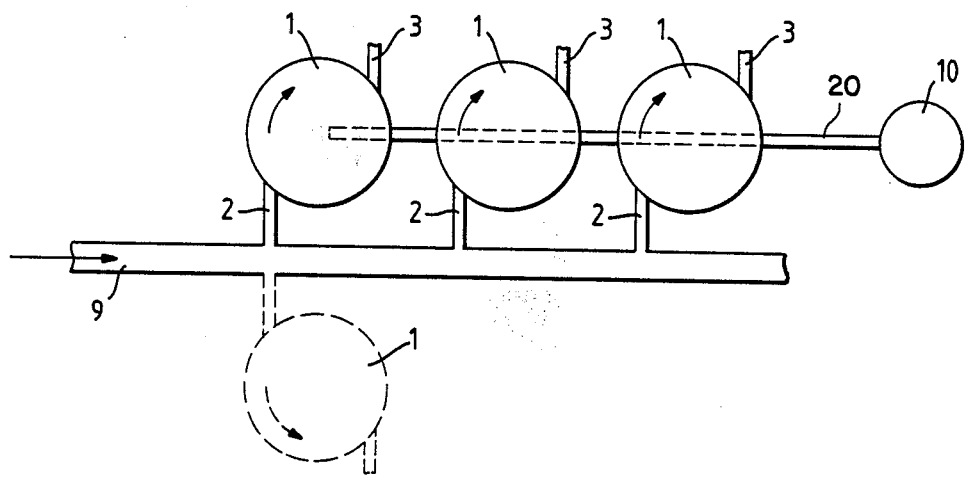
FIG. 2 is a top view of a plant for fishbreeding with several tanks.

In the drawings, a tank 1 has an inlet 2 and an outlet 3. A sludge collector 4 has means 5 and 6 for the collecting of gas. A protection cover 7 and an outlet 8 are located at the bottom of the tanks. A common feeding line 9 joins inlet 2 and a collecting tank 10 for sludge joins outlet 8.

A preferably cylinder formed tank 1 made of canvas, soft plastic or some other non-rigid material is lowered into the water, for instance the sea, which tank contains fish or other water animals. The tank has an inlet 2 and an outlet 3 so dimensioned, that the water level in the tank always is above that of the surrounding water, thus maintaining the tank walls in a fully expanded or tightened out position by the higher static pressure.

According to a preferred embodiment for fish breeding the inlet is tangentially arranged, thus causing a circular flow in the tank. This arrangement has two advantages. The fishes are forced to swim against the current around the tank which stimulates the feeding and minimizes the waste. In addition pollutants are collected in the center of the tank and are easy to remove therefrom.

The tangentially directed outlet 3 is provided with throttle means 18 is dimensioned so that a certain static overpressure is obtained in the tank 1 in comparison to the surroundings.

The tank water is taken from a point in the sea where the water temperature is suitable and/or where the oxygen content and the amount of natural nourishment are great. The transport may be carried out by equipment described in the Swedish Patent No. 8202429-0 of L. E. Nyman et al.

In the center of the tank bottom the device 4 for the collection of sludge is designed like a hopper having relatively steep sides. The pollutants on the tank bottom will then be collected in the sludge collector or hopper 4 and concentrate in its bottom. The hopper 4 is provided with a cover 5 inclined towards the center having a central hole 12 which in its turn is screened by a body 6 at a distance below the cover 5. In this way gas generated in the sludge is prevented from coming up into the tank 1 and poisoning the fish. The gas is instead collected at the periphery in the upper part of the hopper 4 and may be evacuated by exhaust means 19 in a known manner. In order to prevent larger bodies, such as dead fish from falling into the hopper, the hopper is preferably provided with a net or a protection sheet 7.

The lower part of the hopper 4 is connected to an outlet pipe 20 through which the sludge is removed towards a collecting tank 10. This may be carried out by attaching the pipe to a pump or by temporarily inreasing the pressure in the tank 1 in comparison with the pressure in the tank 10. The tank 10 may be common for several breeding tanks and is arranged to treat the sludge in a suitable way. The system is closed and no pollutants will be let out to the surroundings.

In order to seocure feeding of water from outside in case the normal feeding should break down, the upper part of the tank 1 may be provided with barred security openings 14. Under normal conditions the openings 14 are closed from inside by covers 16 pressed against the walls by the static pressure. In case of a stop, the pressures are equalized, the openings 14 are uncovered and water flows into the tank to keep the fishes alive until the error is corrected.

The device according to the invention and the plant that may be built by help of the device have a long range of advantages compared with previously known solutions. Some of the most important are the following:

The tank is manufactured from a relatively inexpensive material and can, thanks to the large water exchange, be treated to minimize the growth of algae. The closed tank also means that disease in one tank is not spread to other tanks in the same plant.

The water rotation in the tank means that the fishes swim and eat maximally, thus minimizing the waste. The rotation also means that the pollutants are collected in the center for easy removing.

Fresh water may be taken from a point where the temperature is suitable, where the oxygen content or the amount of natural nourishment are good.

The device and the plant may be placed anywhere. It does not pollute the surroundings and is not influenced by pollutants in the latter. In addition, ice may be avoided be feeding warmer water during wintertime.

Collecting, sorting and disinfecting of the fish may be simplified by pumping out the water in the tank, the walls then being folded and the bottom being brought upwardly towards the surrounding water surface.

In the separately arranged sludge collecting tank an effective treatment may be carried out which does not have any effect on the environment. The system can also be provided with an integrated complete purification system.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a system of tanks for breeding fish and the like for use in a liquid environment, apparatus comprising in combination:
   a first cylindrical fish tank of a non-rigid material having a first inlet and a first outlet, said first inlet and outlet being below the surrounding liquid line and dimensioned so that the liquid in said first tank is at a level higher than the liquid environment surrounding said first tank, and said first inlet is directed tangentially to said first tank and said first outlet is directed tangentially from said first tank, whereby a rotating liquid flow is created in said first tank;
   first means extending from the bottom of said first tank for collecting sludge and gas, said first means including
   a first conically shaped hopper having a first cover inclined toward the center of the hopper and defining a first central hole,
   a first screening member located adjacent said first central hole for preventing gas from entering said tank and for permitting collection and evacuation of the gas at the upper interior periphery between said first hopper and cover walls,
   a first protection screen positioned over said first central hole to prevent dead fish and the like from falling into said hopper, and
   a first sludge outlet extending from the narrow portion of said conical hopper;
   a feed line coupled to said first inlet; and
   a sludge line coupled to said first sludge outlet to transport the sludge to a collecting tank.

2. The combination of claim 1, further including
   a second cylindrical fish tank of a non-rigid material having a second inlet and a second outlet, said second inlet and outlet being below the surrounding liquid line and dimensioned so that the liquid in said second tank is at a level higher than the liquid environment surrounding said second tank and said second first inlet is directed tangentially to said second tank and said second outlet is directed tangentially from said second tank, whereby a rotating liquid flow is created in said second tank;
   second means extending from the bottom of said second tank for collecting sludge and gas, said second means including
   a second conically shaped hopper having a second cover inclined toward the center of the hopper and defining a second central hole,
   a second screening member located adjacent said second central hole for preventing gas from entering said second tank and for permitting collection and evacuation of the gas and evacuation of gas at the upper interior periphery between said second hopper and cover walls,
   a second protection screen positioned over said second central hole to prevent dead fish and the like from falling into said second hopper, and
   a second sludge outlet extending from the narrow portion of said second conical hopper;
   said feed line being additionally coupled to said second inlet; and
   said sludge line being additionally coupled to said second sludge outlet to transport the sludge to said collecting tank.

* * * * *